US012649538B2

(12) United States Patent
　Maor

(10) Patent No.: US 12,649,538 B2
(45) Date of Patent: Jun. 9, 2026

(54) SCOOTER CONVERTIBLE TO PUSH-CART

(71) Applicant: Golfit Ltd., Ramat Hasharon (IL)

(72) Inventor: Ziv Maor, Ramat Hasharon (IL)

( * ) Notice: Subject to any disclaimer, the term of this patent is extended or adjusted under 35 U.S.C. 154(b) by 141 days.

(21) Appl. No.: 17/768,895

(22) PCT Filed: Apr. 12, 2022

(86) PCT No.: PCT/IL2022/050377
　§ 371 (c)(1),
　(2) Date: Apr. 14, 2022

(87) PCT Pub. No.: WO2022/224238
　PCT Pub. Date: Oct. 27, 2022

(65) Prior Publication Data
　US 2024/0092448 A1　Mar. 21, 2024

Related U.S. Application Data

(60) Provisional application No. 63/178,003, filed on Apr. 22, 2021.

(51) Int. Cl.
| | |
|---|---|
| *B62K 5/007* | (2013.01) |
| *A63B 55/60* | (2015.01) |
| *B62B 3/02* | (2006.01) |
| *B62B 5/00* | (2006.01) |
| *B62B 5/06* | (2006.01) |
| *B62B 5/08* | (2006.01) |
| *B62D 51/02* | (2006.01) |
| *B62K 3/00* | (2006.01) |
| *B62K 15/00* | (2006.01) |
| *B62K 21/12* | (2006.01) |

(52) U.S. Cl.
　CPC .............. *B62K 5/007* (2013.01); *B62B 5/067* (2013.01); *B62K 3/002* (2013.01); *B62K 15/008* (2013.01); *B62K 21/125* (2013.01); *A63B 2055/601* (2015.10); *B62B 3/02* (2013.01); *B62B 5/0033* (2013.01); *B62B 5/0076* (2013.01); *B62B 5/087* (2013.01); *B62B 2202/404* (2013.01); *B62D 51/02* (2013.01)

(58) Field of Classification Search
　CPC ........ B62K 2005/002; B62B 2202/404; A63B 55/61
　USPC ..................................................... 280/DIG. 5
　See application file for complete search history.

(56) References Cited

U.S. PATENT DOCUMENTS

| | | | | |
|---|---|---|---|---|
| 3,434,558 A | * | 3/1969 | Allen ...................... | B62K 5/027 |
| | | | | 180/209 |
| 4,118,048 A | * | 10/1978 | Spranger ................. | B62B 3/006 |
| | | | | 280/47.35 |
| 4,848,504 A | * | 7/1989 | Olson .................... | B62K 3/002 |
| | | | | 280/DIG. 6 |

(Continued)

FOREIGN PATENT DOCUMENTS

| | | | | |
|---|---|---|---|---|
| CN | 109927811 A | * | 6/2019 | ............. B62B 5/085 |
| CN | 110329338 A | * | 10/2019 | ............... B62B 9/00 |

(Continued)

*Primary Examiner* — Emma K Frick

(57) ABSTRACT

A motorized scooter that may be reversibly converted into a push-cart, which may be powered or non-powered. Converting to a push-cart may include shortening a wheel base and/or tilting a steering column backward and/or extending a steering handle backward.

20 Claims, 16 Drawing Sheets

(56)                     References Cited

U.S. PATENT DOCUMENTS

| | | | | |
|---|---|---|---|---|
| 5,245,144 A * | 9/1993 | Stammen | ........... | B62D 51/002 |
| | | | | 200/61.85 |
| 5,307,889 A * | 5/1994 | Bohannan | ........... | B62D 61/065 |
| | | | | 280/DIG. 5 |
| 5,346,028 A * | 9/1994 | Cassano | ................ | B62K 5/027 |
| | | | | 180/215 |
| 5,350,982 A | 9/1994 | Seib | | |
| 6,301,746 B1 * | 10/2001 | Myers | .................. | A45C 13/262 |
| | | | | 16/113.1 |
| 6,302,421 B1 | 10/2001 | Lee | | |
| 6,361,063 B1 * | 3/2002 | Daeschner | ........... | B62B 5/0438 |
| | | | | 280/47.3 |
| 6,474,427 B1 * | 11/2002 | Tunnecliff | .............. | B62D 21/14 |
| | | | | 180/19.1 |
| 7,581,748 B2 * | 9/2009 | Reimers | ............... | B62B 5/0026 |
| | | | | 280/DIG. 6 |
| D606,899 S * | 12/2009 | Gal | .................................. | D12/1 |
| 8,365,850 B2 * | 2/2013 | Gal | ........................ | B62K 3/002 |
| | | | | 180/209 |
| 8,424,628 B1 * | 4/2013 | Schade | ............... | B62K 11/007 |
| | | | | 280/727 |
| 8,573,338 B2 | 11/2013 | Gal et al. | | |
| 9,120,657 B1 * | 9/2015 | Turner | ................. | B62B 5/0056 |
| 9,174,692 B2 | 11/2015 | Treadway et al. | | |
| 9,205,882 B1 * | 12/2015 | Hoffman | ................... | B66F 9/06 |
| 9,469,322 B2 * | 10/2016 | Du Toit | ................. | A63B 55/61 |
| 9,550,540 B1 * | 1/2017 | Wang | ...................... | B62K 5/05 |

| | | | | |
|---|---|---|---|---|
| 2009/0242284 A1 * | 10/2009 | Whetstone, Jr. | ........ | B62D 51/04 |
| | | | | 180/19.2 |
| 2010/0123294 A1 * | 5/2010 | Ellington | ................. | B62B 3/02 |
| | | | | 180/19.3 |
| 2012/0118657 A1 * | 5/2012 | Liao | ....................... | A63B 55/61 |
| | | | | 180/208 |
| 2014/0125021 A1 | 5/2014 | Du Toit | | |
| 2015/0209205 A1 | 7/2015 | Ransenberg et al. | | |
| 2020/0008990 A1 | 1/2020 | Harrison | | |

FOREIGN PATENT DOCUMENTS

| | | | | | |
|---|---|---|---|---|---|
| DE | 20012888 U1 * | 11/2000 | ............. | A63B 55/60 |
| GB | 2630624 A * | 12/2024 | ............. | B62B 3/001 |
| IL | 292295 B1 | 7/2025 | | |
| JP | 2002085472 A | 3/2002 | | |
| JP | 3369271 B2 | 1/2003 | | |
| JP | 3505437 B2 | 3/2004 | | |
| JP | 2005053461 A | 3/2005 | | |
| JP | 5011293 B2 | 8/2012 | | |
| JP | 2018061305 A | 4/2018 | | |
| KR | 20190036299 A * | 4/2019 | ............. | B62K 13/08 |
| KR | 20250001769 U * | 12/2025 | .............. | B62B 3/02 |
| NL | 193529 C | 1/2000 | | |
| NL | 2020496 B1 * | 9/2019 | ............. | A63B 55/61 |
| WO | WO2014009143 A1 | 1/2014 | | |
| WO | WO2017009695 A1 | 1/2017 | | |
| WO | WO-2017068316 A1 * | 4/2017 | | |
| WO | WO-2025105008 A1 * | 5/2025 | ............. | B62K 15/00 |
| WO | WO-2025150375 A1 * | 7/2025 | ............. | B62K 5/007 |

* cited by examiner

SCOOTER CONVERTIBLE TO PUSH-CART

BACKGROUND OF THE INVENTION

The present invention, in some embodiments thereof, relates to a personal vehicle and, more particularly, but not exclusively, to a multipurpose vehicle.

NL193529C discloses a personal mobility vehicle comprises front and rear frame sections which may be disassembled and assembled, and which may be readily attached to the powered rear frame section.

WO2017009695 discloses a personalized portable interconvertible multi-utility apparatus, wherein the mobility apparatus is converted to a plurality of indoor and outdoor equipment like a bed, a seating chair, a travelling bag, a dining table, a study table, a sofa, a laptop table, a workstation, a shopping trolley, a tent, a lounger, a personal commuting vehicle, a social commuting unit, an exercycler and an emergency stretcher via a plurality of hardware, software and firmware add-ons.

US20200008990 discloses a reconfigurable wheeled personal mobility device comprising a wheeled personal mobility device for transporting a person, an electric motor for use with the personal mobility device, a splined connection, an electromagnetic braking system and a steering engagement mechanism, wherein the wheeled personal mobility device is reconfigurable between at least three configurations.

U.S. Pat. No. 6,302,421 discloses a vehicle with a caster having a disconnectable steering system so the vehicle may be quickly and easily converted back and forth between rider-steerable and externally steerable configurations. Wherein the vehicle may be a stroller, a toy vehicle, a scooter, a wheelchair, a cart, a dolly, etc., and it may have more than one caster.

US20150209205A1 discloses a motorized vehicle having a wheel retraction apparatus, comprising: a plurality of rear wheels and at least one front wheel; a lower chassis having a foot surface mounted thereon; and a wheel retraction apparatus mechanically connected to said lower chassis and set to extract and retract said plurality of rear wheels from and towards said lower chassis and to fixate said plurality of rear wheels in a plurality of different widths from one another; wherein a distance between an axis passing through the centers of said plurality of rear wheels and said at least one front wheel is reduced when said plurality of rear wheels are retracted towards said lower chassis.

There exist a large number of convertible vehicles that convert between various forms such as non-powered scooters that convert to non-powered push carts (e.g., shopping carts), powered scooters that convert to utility vehicles. However, there is a need for a powered scooter that converts to a push-cart, which may be powered or non-powered for use particularly, but not exclusively, by a person who is mildly physically limited.

SUMMARY OF INVENTION

According to an aspect of some embodiments of the invention, there is provided a vehicle which is reversibly convertible from scooter mode to push-cart mode including: a steering system including a front wheel, and a steering column; a front portion connected to the steering system; a rear portion including a rear wheel; and a linkage connecting the front portion to the rear portion, the linkage shortening a wheelbase of the vehicle in the push-cart mode in comparison to the scooter mode.

According to some embodiments of the invention, the linkage includes multiple hinges.

According to some embodiments of the invention, the linkage includes multiple bars.

According to some embodiments of the invention, the linkage includes a reversible connection, of the front and the rear portions.

According to some embodiments of the invention, the reversible connection includes a self locked lever.

According to some embodiments of the invention, the lever is an eccentric clamping lever.

According to some embodiments of the invention, the reversible connection is operable with no tools.

According to some embodiments of the invention, the reversible connection is configured to be operable without dismantling.

According to some embodiments of the invention, the linkage is foldable and locks in two configurations to provide the scooter mode and the push-cart mode.

According to some embodiments of the invention, on converting to push-cart mode the rear portion of the vehicle moves towards the front portion of the vehicle, thereby reducing a distance between the front wheel and the rear wheel.

According to some embodiments of the invention, on converting to push-cart mode the front portion and the steering column tilt backward.

According to some embodiments of the invention, on converting to push-cart mode the steering system tilts backward towards a user such that a caster effect is created in the front wheel.

According to some embodiments of the invention, the steering system further includes handlebars and a walking handle.

According to some embodiments of the invention, the handlebars are reversibly connected to the steering system.

According to some embodiments of the invention, the reversible connection includes a self locked lever.

According to some embodiments of the invention, the lever is an eccentric clamping lever.

According to some embodiments of the invention, the reversible connection is operable with no tools.

According to some embodiments of the invention, the reversible connection is configured to be operable without dismantling.

According to some embodiments of the invention, the handlebars are adjustable and lockable.

According to some embodiments of the invention, on converting to push-cart mode the walking handle is extended from its storage position towards a user.

According to some embodiments of the invention, the walking handle is adjustable and lockable.

According to some embodiments of the invention, the front portion includes a battery and a battery support.

According to some embodiments of the invention, the vehicle further includes a removable rechargeable battery.

According to some embodiments of the invention, in push-cart mode the vehicle is switchable between a push-cart powered mode and a push-cart non-powered mode.

According to some embodiments of the invention, the handlebars comprise a control panel configured to pre-set or adjust a speed of the vehicle in a motorized mode.

According to some embodiments of the invention, the vehicle further includes a control panel configured to switch the vehicle between a push-cart powered mode and a push-cart non-powered mode.

According to some embodiments of the invention, the vehicle further includes a control panel configured to switch between forward and reverse direction of movement in a motorized mode.

According to some embodiments of the invention, in push-cart mode the vehicle is configured to be pushed manually in a non-powered mode.

According to some embodiments of the invention, in push-cart mode the vehicle is configured to serve as a walker in a non-powered mode.

According to some embodiments of the invention, the walking handle comprises a button on at least one side for powering the push-cart.

According to some embodiments of the invention, pressing the button on the walking handle while in a push-cart non-powered mode switches the vehicle to a push-cart powered mode.

According to some embodiments of the invention, releasing the button on the walking handle stops the push-cart.

According to some embodiments of the invention, after stopping a parking brake is engaged automatically.

According to some embodiments of the invention, the vehicle is configured for direction by remote control while in a motorized mode.

According to some embodiments of the invention, the vehicle is configured to follow a user automatically while in a motorized mode.

According to some embodiments of the invention, the vehicle in push-cart mode is configured for manual direction while in a powered mode.

According to some embodiments of the invention, the vehicle further includes a speed throttle configured for operation on both the right and left side of the handlebars for powering the scooter and controlling its speed.

According to some embodiments of the invention, releasing a speed throttle on the handlebars stops the scooter.

According to some embodiments of the invention, after stopping a parking brake is engaged automatically.

According to some embodiments of the invention, in scooter mode riding is optionally performed in a stand-up position on one or more footboards, while seated on a high bicycle-like seat, while seated on a mobility scooter/tractor-like seat.

According to some embodiments of the invention, the vehicle further includes a reversibly connected high bicycle-like seat and a reversibly connected mobility scooter/tractor-like seat.

According to some embodiments of the invention, at least one of the bicycle-like seat and the mobility scooter/tractor-like seat are stowable onboard the vehicle.

According to some embodiments of the invention, the vehicle further includes accessory supports configured to carry a shopping basket or cart, a golf bag, one or more child seats, an umbrella, a drink bottle or thermos, a bicycle-like seat and a mobility scooter/tractor-like seat while stowed.

According to some embodiments of the invention, the accessory supports are positioned on the front portion of the vehicle.

According to some embodiments of the invention, a trailer is hooked to the rear portion of the vehicle.

According to an aspect of some embodiments of the invention, there is provided a method in accordance with any combination of embodiments herein.

According to an aspect of some embodiments of the invention, there is provided a system in accordance with any combination of embodiments herein.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Figure 10:
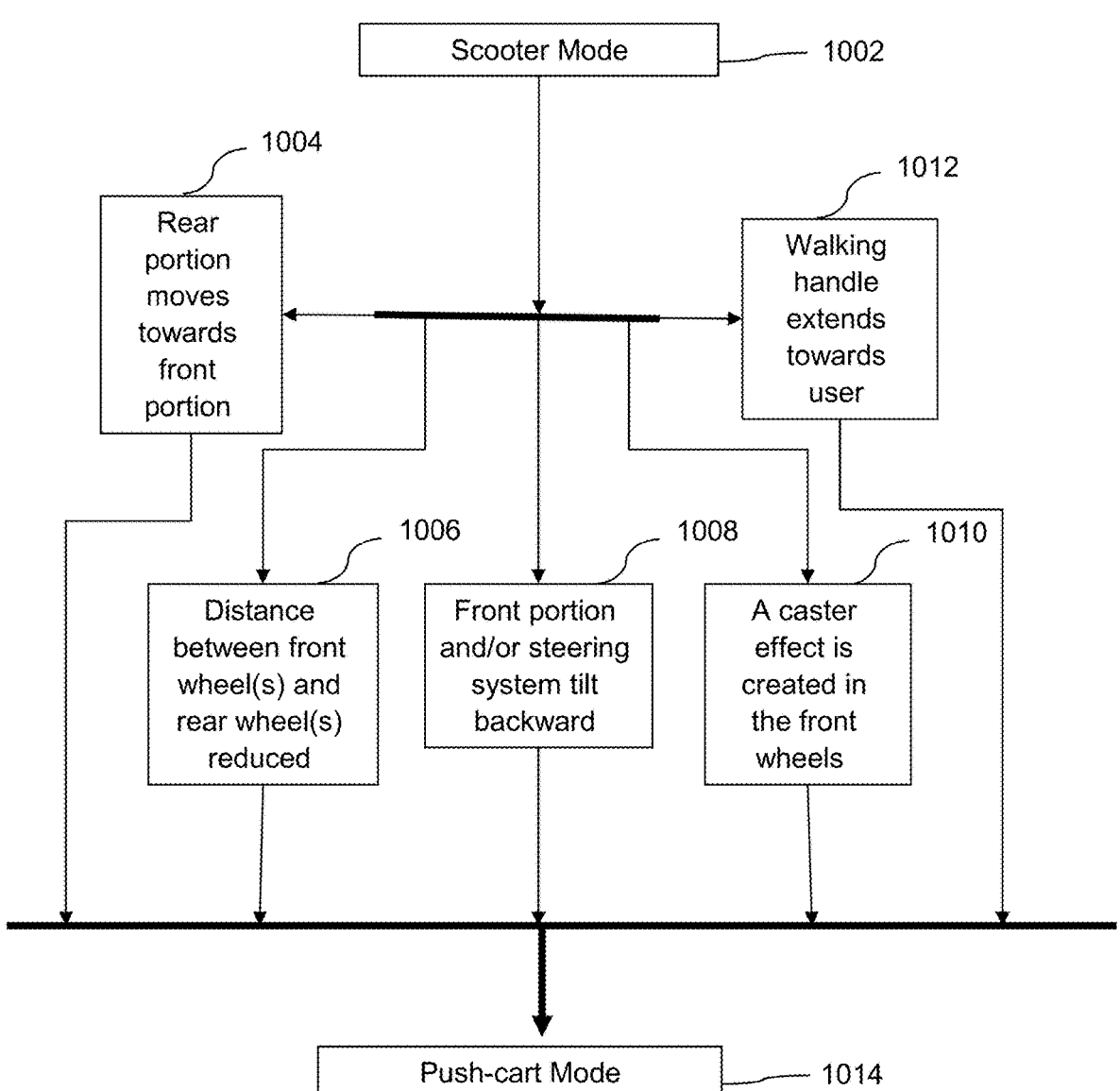
Figure 11:
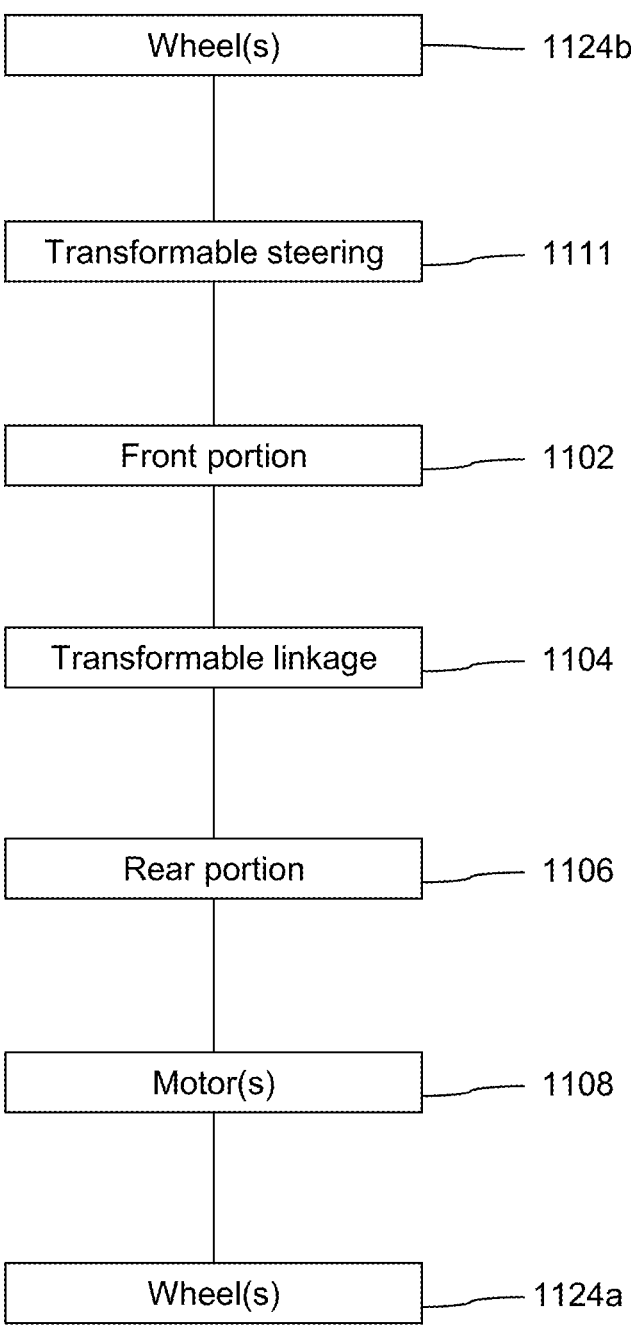

FIG. 10. is a flow chart diagram showing the conversion from scooter mode to push-cart mode in accordance with an embodiment of the current invention; and FIG. 11 is a block diagram illustration of a transformable scooter in accordance with an exemplary embodiment of the invention.

Figure 12:
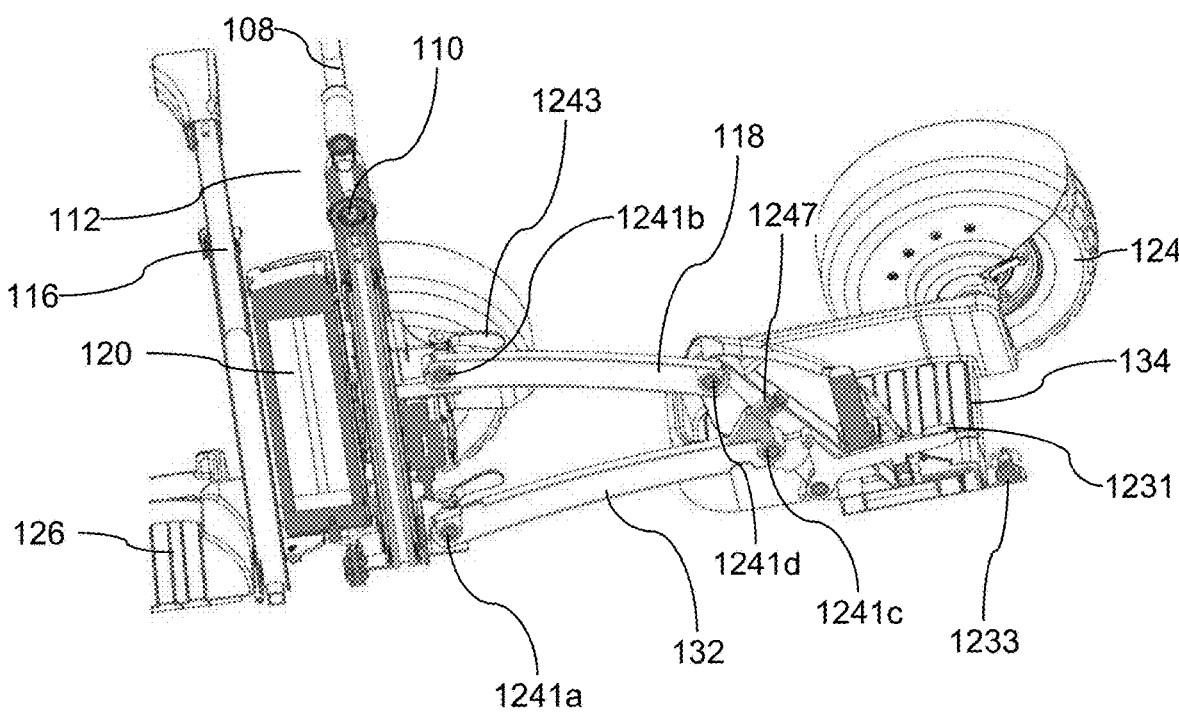

FIG. 12 is a cross sectional view of a transformable scooter in accordance with an exemplary embodiment of the invention.

Figure 13:
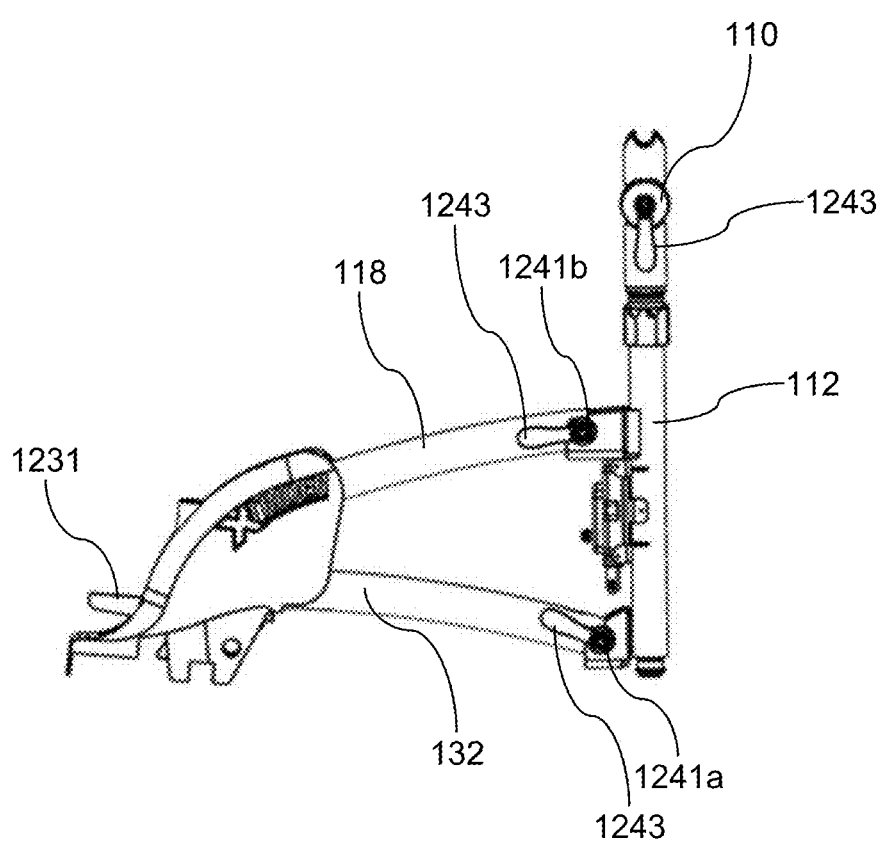

FIG. 13 is a perspective view of a linkage of a transformable scooter in accordance with an exemplary embodiment of the invention.

Figure 14:
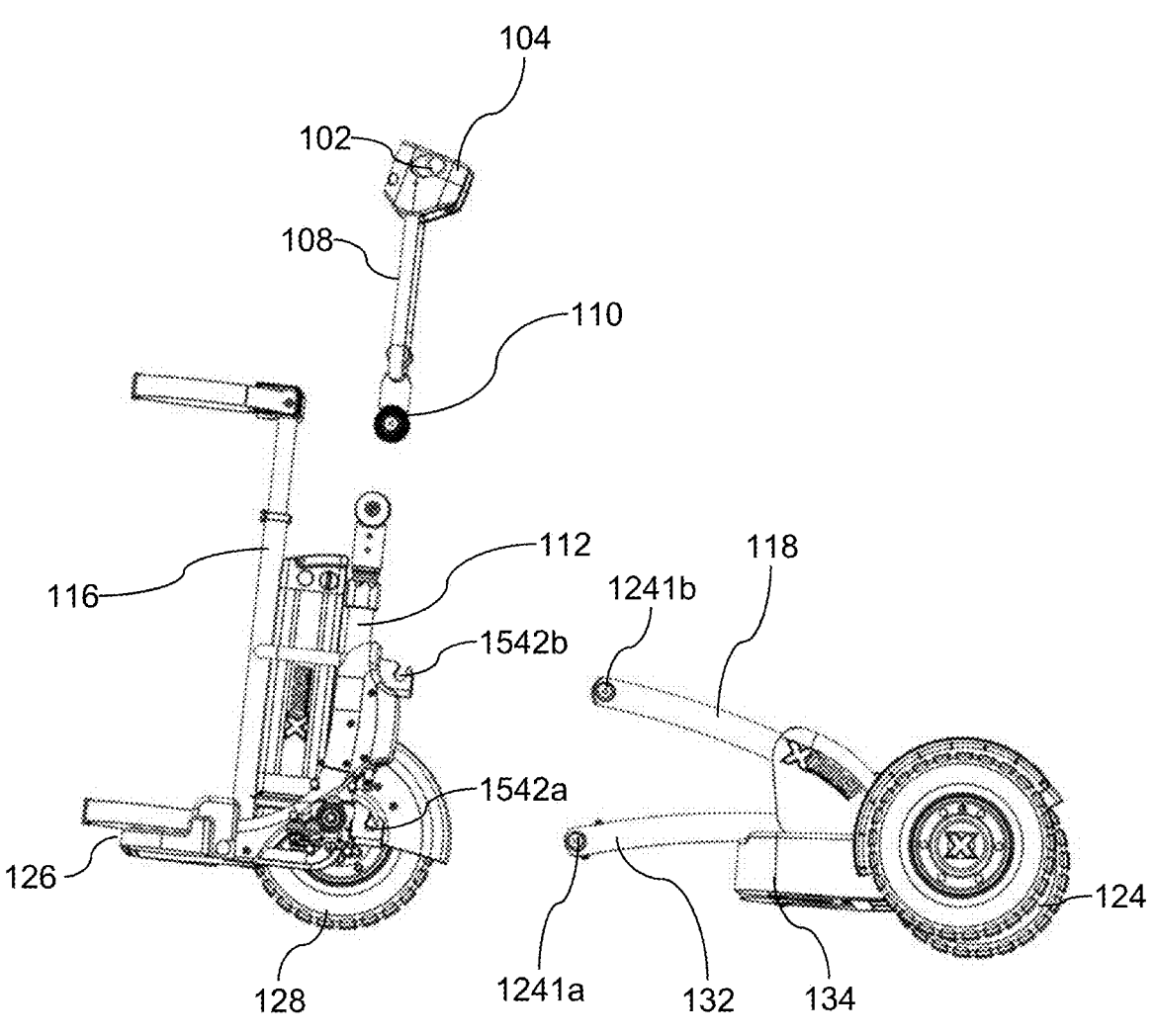

FIG. 14 is a perspective view of separated sections of a transformable scooter in accordance with an exemplary embodiment of the invention.

Figure 15:
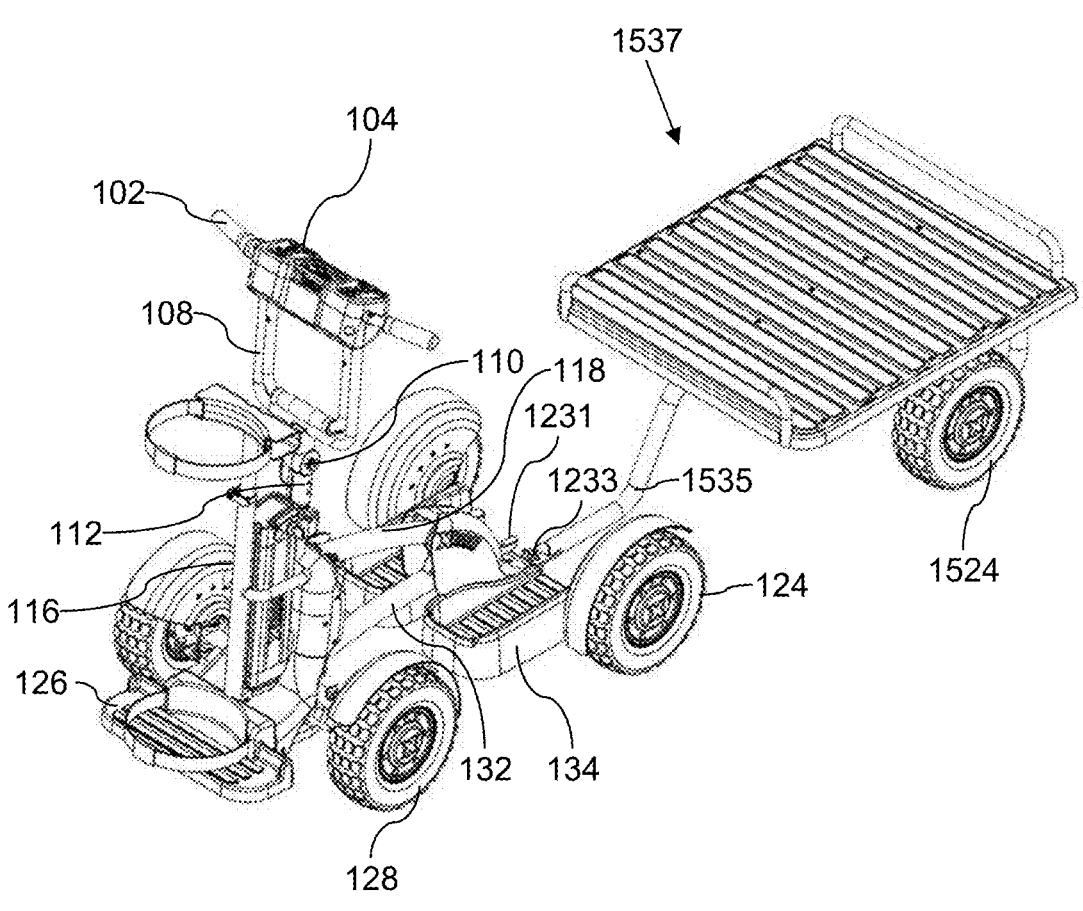

FIG. 15 is a perspective view of a transformable scooter with a trailer in accordance with an exemplary embodiment of the invention.

Figure 16:
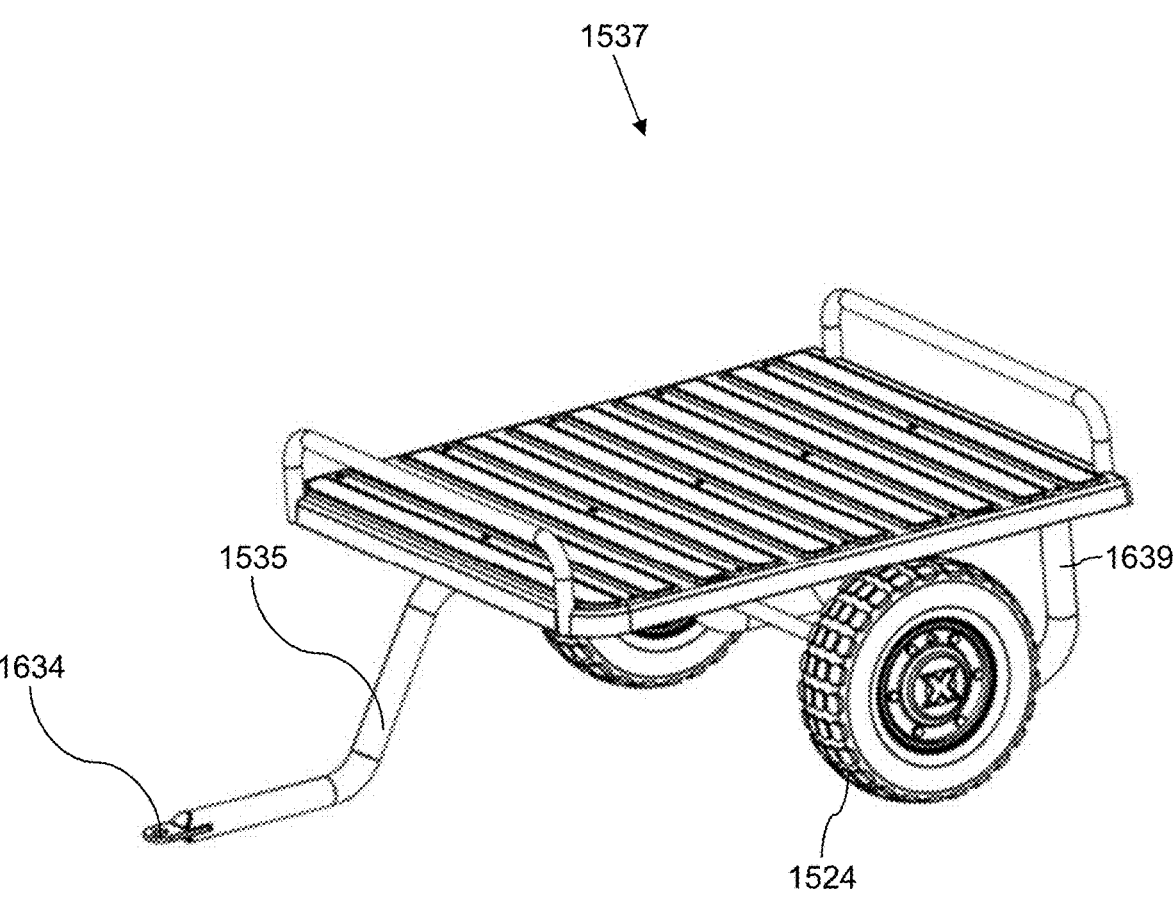

FIG. 16 is a perspective view of a trailer in accordance with an exemplary embodiment of the invention.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

DETAILED DESCRIPTION OF THE INVENTION

The present invention, in some embodiments thereof, relates to a personal vehicle and, more particularly, but not exclusively, to a multipurpose vehicle.

Overview

People of all ages have mobility problems due to illness, age, medical conditions, operations, or recovering from injury. There is a wide variety of different mobility devices to assist in mobility: including walkers, wheelchairs and powered scooters. They are each designed to assist with a particular problem or activity, but the narrow scope of the benefits that any single device tends to offer restricts the scope of the activities the user can engage in with that particular device.

Therefore, there is a need for mobility devices that convert from one form to another to assist people in various different situations, to adjust as their strength and ability either improves or deteriorates, and to reduce the physical, emotional and financial burden of buying a mobility device.

The current invention in some embodiments thereof relates to a motorized scooter that may be reversibly converted into a cart. In some embodiments, the cart may include a power assisted cart and/or non-powered push-cart and/or a remote-controlled cart and/or an automatically following cart and/or an independent robotic cart. Optionally, a scooter is configured for use by a person who is mildly physically limited and/or who has difficulty walking long distances and/or over rough terrain (outside over curbs etc.). For example, the user of the mobility scooter may be able to walk indoors (for example along aisles of a store) with or without limited assistance (for example with a walker). For example, a person may use the device as a mobility scooter to get to the store, but inside the store in more crowded conditions may use it as a shopping cart and/or a walker to steady himself. For example, a healthy person may also find this functionality useful.

In some embodiments, the vehicle may include a front portion and a rear portion interconnected by a transformable linkage. For example, the linkage may be extendable and/or contractable. Optionally, the front portion may include a transformable steering system. For example, the steering system may have a forward position above the front portion of the vehicle (for example used during scooter mode [e.g., scooter mode may include a standing ride-on scooter mode, a mode wherein the user rides using a bicycle type seat and/or a mode wherein the user sits on a bench and/or a full seat]) and/or a rear position. For example, a steering column and/or handle of the steering system may extend backward behind the rear wheels in the push-cart mode.

In some embodiments, the push-cart mode may have a shorter wheel base than in one or more of the possible scooter modes. For example, the wheel base of the scooter mode may be between 1.1 to 1.3 times and/or between 1.05 to 1.1 times and/or between 1.3 to 1.8 times and/or between 1.8 to 2.5 times the wheel base of the push-cart mode. For example, the wheel base in the push-cart mode may range between 70 to 90 cm and/or between 90 to 150 and/or between 150 to 250 and/or between 40 to 70 cm. For example, the wheel base in the scooter mode may range between 90 to 110 cm and/or between 110 to 170 and/or between 170 to 270 and/or between 60 to 90 cm. For example, the wheel base of the scooter mode may range between 10 to 30 cm and/or between 5 to 10 cm and/or between 30 to 100 cm greater than the wheel base of the push-cart mode.

In some embodiments the width of the vehicle may range between 60 to 100 cm and/or between 30 to 60 cm and/or between 100 to 200 cm. In some embodiments, the height of the vehicle may range between 70 to 120 cm and/or between 40 to 70 cm and/or between 120 to 200 cm. In some embodiments, the vehicle may have footboards for riding while standing and/or for resting the feet while sitting. For example, the stepping height of the footboards in the scooter mode may range between 5 to 15 cm and/or between 2 to 5 cm and/or between 15 to 30 cm.

In some embodiments, the vehicle may include one or more motors, for example electric motors. Optionally, the motors may each have a power output ranging between 100 to 300 W and/or between 300 to 600 W and/or between 600 to 1000 W. Optionally the combined power of the motors may range between 200 to 600 W and/or between 600 to 1200 W and/or between 1200 to 3000 W. Optionally the vehicle will include a battery. For example, the battery may have a capacity ranging between 10 to 20 Ah and/or between 5 to 10 Ah and/or between 20 to 40 Ah.

In some embodiments, the weight of the vehicle may range between 20 to 60 kg and/or between 10 to 20 kg and/or between 60 to 120 kg. Optionally the ratio of weight between front and rear portions may range between 1.2 to 0.8 and/or between 0.5 to 0.8 and/or between 1.2 to 2.0.

Exemplary Embodiments

Before explaining at least one embodiment of the invention in detail, it is to be understood that the invention is not necessarily limited in its application to the details of construction and the arrangement of the components and/or methods set forth in the following description and/or illustrated in the drawings and/or the examples. The invention is capable of other embodiments or of being practiced or carried out in various ways.

Figure 1:
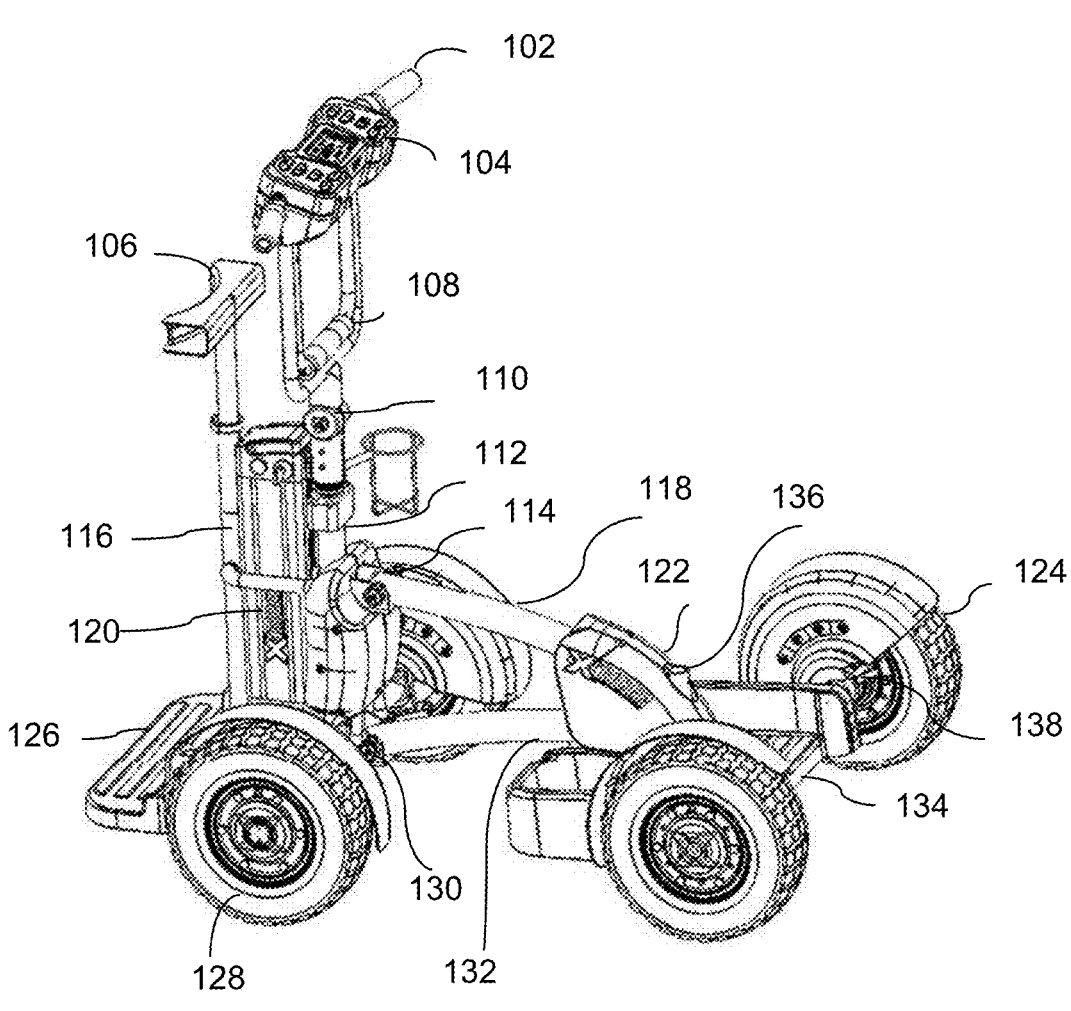
FIG. 1 is a schematic perspective view of a vehicle in scooter mode in accordance with an embodiment of the current invention.
Figure 2:
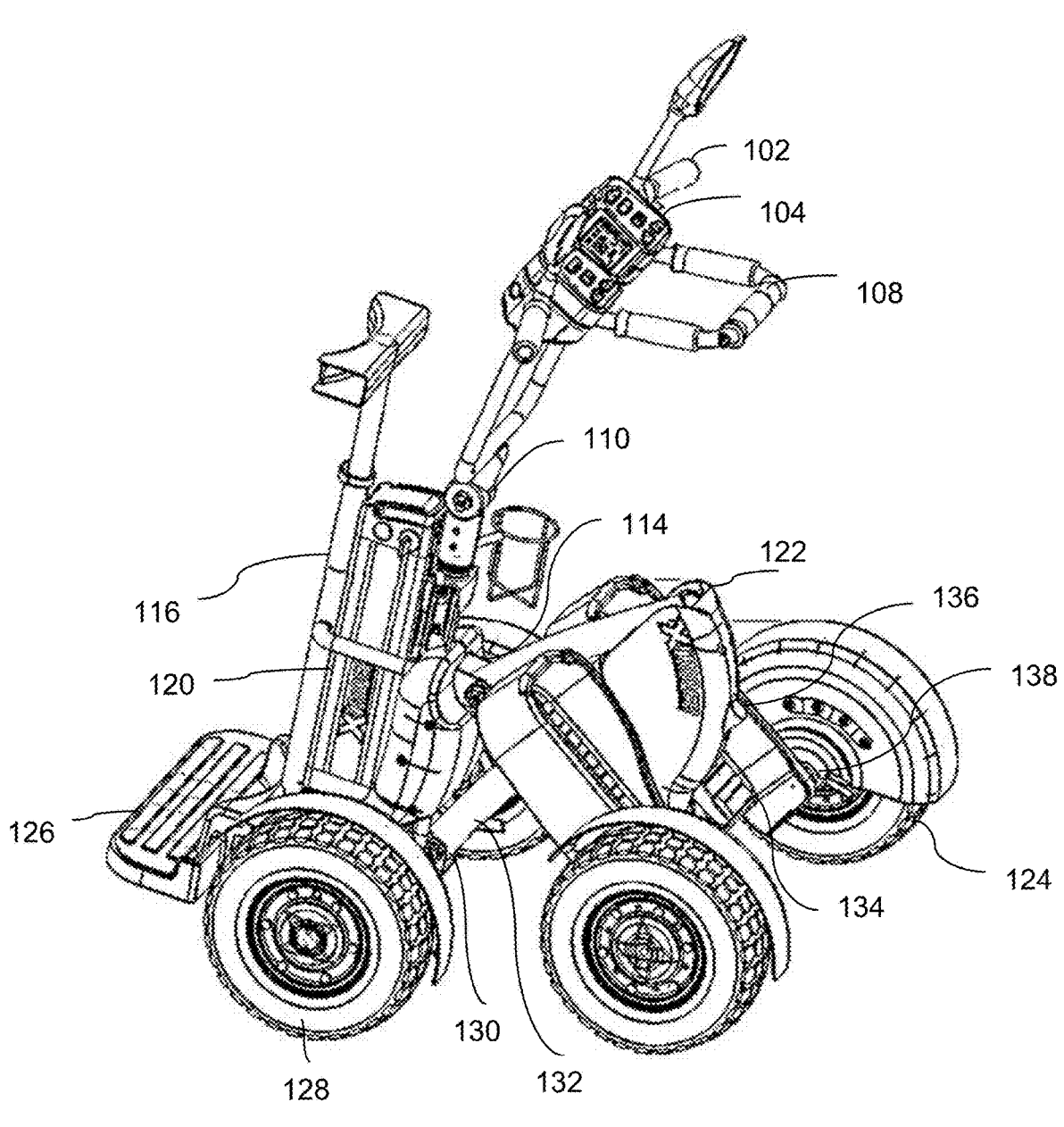
FIG. 2 is a schematic perspective view of a vehicle in push-cart mode in accordance with an embodiment of the current invention.

FIG. 1 is a schematic perspective view of a vehicle in scooter mode in accordance with an embodiment of the current invention. FIG. 2 is a schematic perspective view of a vehicle in push-cart mode in accordance with an embodiment of the current invention. In some embodiments a vehicle may be reversibly converted from scooter mode (e.g., FIG. 1) to push-cart mode (e.g., FIG. 2). Optionally, the vehicle comprises a front portion 106. For example, the front portion may include a steering system. For example, the steering system may comprise one or more steerable front wheels 128. Optionally the front wheels and/or the entire front portion may steer by rotation about a steering column 112. Alternatively or additionally, steering may be hub centered. For example, the front portion may remain in line with the rear portion while wheels 128 rotate around an axis of their own. For example, the vehicle may include a rack and pinion system and/or a variable ratio steering system.

In some embodiments, the length of steering column 112 may be varied. For example, column 112 may be telescopic. The steering system optionally includes one or more handles and/or steering wheels and/or steering sticks. For example, the vehicle may be steered by turning handlebars 102, and/or by directing a walking handle 108 from side to side.

In some embodiments the vehicle includes a rear portion that is moveable with respect to the front portion. Optionally, the rear portion comprises one or more rear wheels 124. Additionally or alternatively, the rear portion may include one or more footboards 134. Additionally or alternatively, the rear portion may include a seat and/or a seat support port 136. For example, support may include a port 136 for inserting a seat post. Alternatively or additionally, there may be a permanently mounted seat.

In some embodiments, the rear portion is connected to the front portion and/or the steering system by a transformable linkage system. For example, the linkage system may include one or more spacers. For example, spacers may include bars 118, 132 and/or a linkage 122. In some embodiments, spacers may be transformable. For example, bars 118, 132 and linkage 122 may be interconnected by hinges 114, 130. Optionally, lockable linkage 122 fixes the vehicle in one or another configuration. For example, the linkage system may be transformable between a long wheelbase scooter mode and/or a short wheelbase push-cart mode. Optionally, when the wheel base is transformed between the scooter mode and the push-cart mode, the steering column 112 may tilt backwards. Additionally or alternatively, the steering stick (e.g., walking handle 108) may be extended backward from the steering column. For example, in the push-cart mode, the steering stick (e.g., handle 108 and/or handlebars 102) may extend behind the rear wheels 124. Additionally or alternatively, in the scooter mode, the steering column 112 may tilt towards vertical (e.g., more forward and/or more vertical than in the push-cart mode).

In an embodiment the linkage system transforms to the push-cart mode and/or shortens the wheel base of the vehicle by folding bars 118, 132 around hinges 114, 130 and/or linkage 122. For example, a spacer connected to the front portion (e.g., bars 118, 132) may fold upward by pivoting upward from a connection to the front portion, (e.g., at hinges 114 and/or 130). Additionally or alternatively, a spacer connected to the rear portion (e.g., linkage 122) may fold upward (for example around the axis of rear wheels 124). Optionally, the front portion is brought closer to the rear portion by folding the linkage. For example, the front spacer (e.g., bars 118, 132) is folded towards the rear spacer (e.g., linkage 122) around a pivot (e.g., the axel of rear wheels 124). Alternatively or additionally, a linkage may telescope and/or bend and/or fold up like an accordion and/or fold out sideways etc. Optionally, linkage 122 is transformable and/or locks in two configurations to provide the scooter mode and the push-cart mode.

In some embodiments, the spacers (bars 132, 118 and linkage 122) and/or connectors (e.g., hinges 130, 114) are configured such that as the wheel base is reduced, the steering column 112) leans toward the rear. For example, a lower front space (e.g., bar 132) connects closer to the pivot point (e.g., the axis of rear wheels 124) of the rear spacer (e.g., linkage 122) than an upper front spacer (e.g., bar 118)

thus, as the linkage folds up, the top of steering column 112 is drawn further toward the rear than the lower portion of the steering column 112 and/or causing the steering column 112 to tilt backward.

In an embodiment, in scooter mode (e.g., as illustrated in FIG. 1) the height above ground of the one or more footboards 134 is small in order to allow easy stepping on/off the scooter and/or make riding stable and/or safe. For example, one or more footboards 134 are designed to transform in a way that increases ground clearance in push-cart mode. For example, a footboard 134 may pivot upward, for example, by rotation about a pivot (for example the axis 138 of rear wheels 124 as illustrated in FIG. 2). In an embodiment, the one or more footboards are foldable.

Optionally, the vehicle includes an accessory support 126. For example, accessory support 126 may be connected to the front portion. Optionally, the support 126 swivels with the front wheels during steering. Alternatively or additionally, (e.g., for hub centered steering), the orientation of the support 126 may be fixed during steering.

Optionally the vehicle includes one or more motors. For example, the vehicle may include dual motors in the wheels 128 of the front portion of the vehicle. Additionally or alternatively, one or more motors may be installed into the rear wheels 124 of the vehicle. Alternatively or additionally, a motor may be mounted on the chassis of the vehicle (e.g., the front portion and/or the rear portion) and/or drive the wheels 124, 128 via a drive chain.

In an embodiment converting to push-cart mode the walking handle 108 is extended backward toward the user pushing the cart. For example, handle 108 pivots up from its storage position against the steering column 112 below the handlebar 102 (e.g., FIG. 1, FIG. 4 and FIG. 7) of the steering system towards the user, and then locks in place (e.g., FIG. 2, FIG. 5 and FIG. 8). For example. after walking for a long period, the hand holding the handle may get tired. Therefore, a locking mechanism for the walking handle allows the user to rest his hand on the handle and/or to make steering easier (e.g., FIG. 5). The height and/or the angle of the walking handle 108 are optionally adjustable 110, as is the height and/or the angle of the handlebars and/or the length of the linkage system in order to suit the individual user. Alternatively or additionally, an adjustable 110 hinge may be used to fold the handlebars 102 backward in the push-cart mode for storage and/or transportation purposes.

In an embodiment in push-cart mode (e.g., FIG. 2 and FIG. 5) the length of the vehicle is shortened by the transformation described above, so as to allow the walking handle 108, which is connected to the handlebars 102 and held by the user, to be as short as possible for convenient steering by one hand, and/or to ensure that the user's legs do not hit the footboards 134 while walking.

In an embodiment, in scooter mode the vehicle is long enough so the user may stand/sit in front of the rear wheel's axel (e.g., FIG. 1, FIG. 3 and FIG. 4), thus reduce the risk of flipping over backward, particularly in a steep climb. In an embodiment, the front portion of the scooter is located in front of the steering system to provide additional stability.

In some embodiments, a throttle and/or other controls may be on one or both of left and/or right handlebars 102 and/or the control panel 104 and/or the walking handle 108. In some embodiments, a braking system stops the scooter automatically, when the throttle is released and/or sets a parking brake automatically when the vehicle is stopped (optionally after a time delay). Alternatively or additionally, there may be a manual break engaging mechanism.

Figure 3:
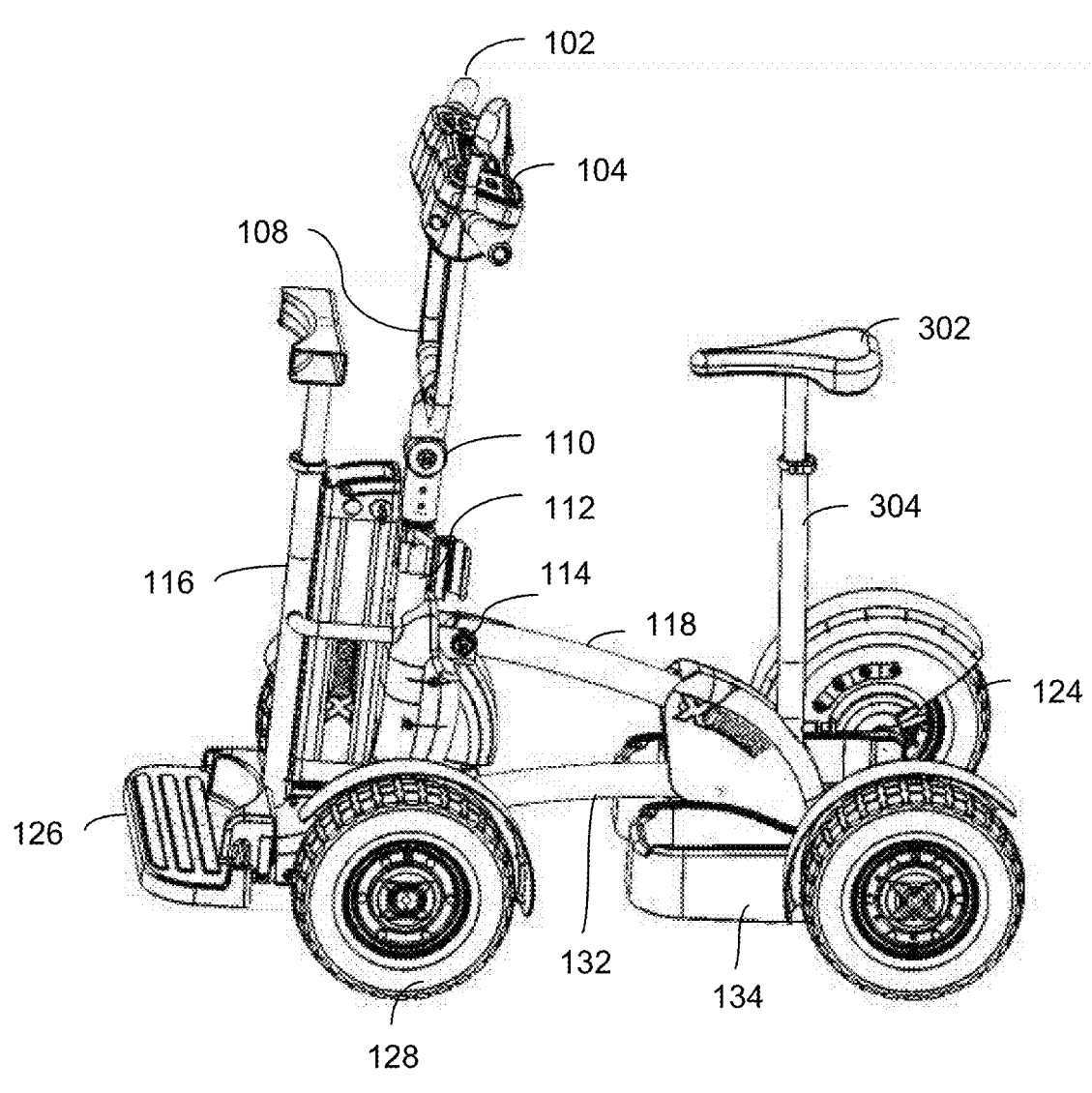
FIG. 3 is a schematic perspective view of a scooter with a bicycle-like seat in accordance with an embodiment of the current invention.
Figure 4:
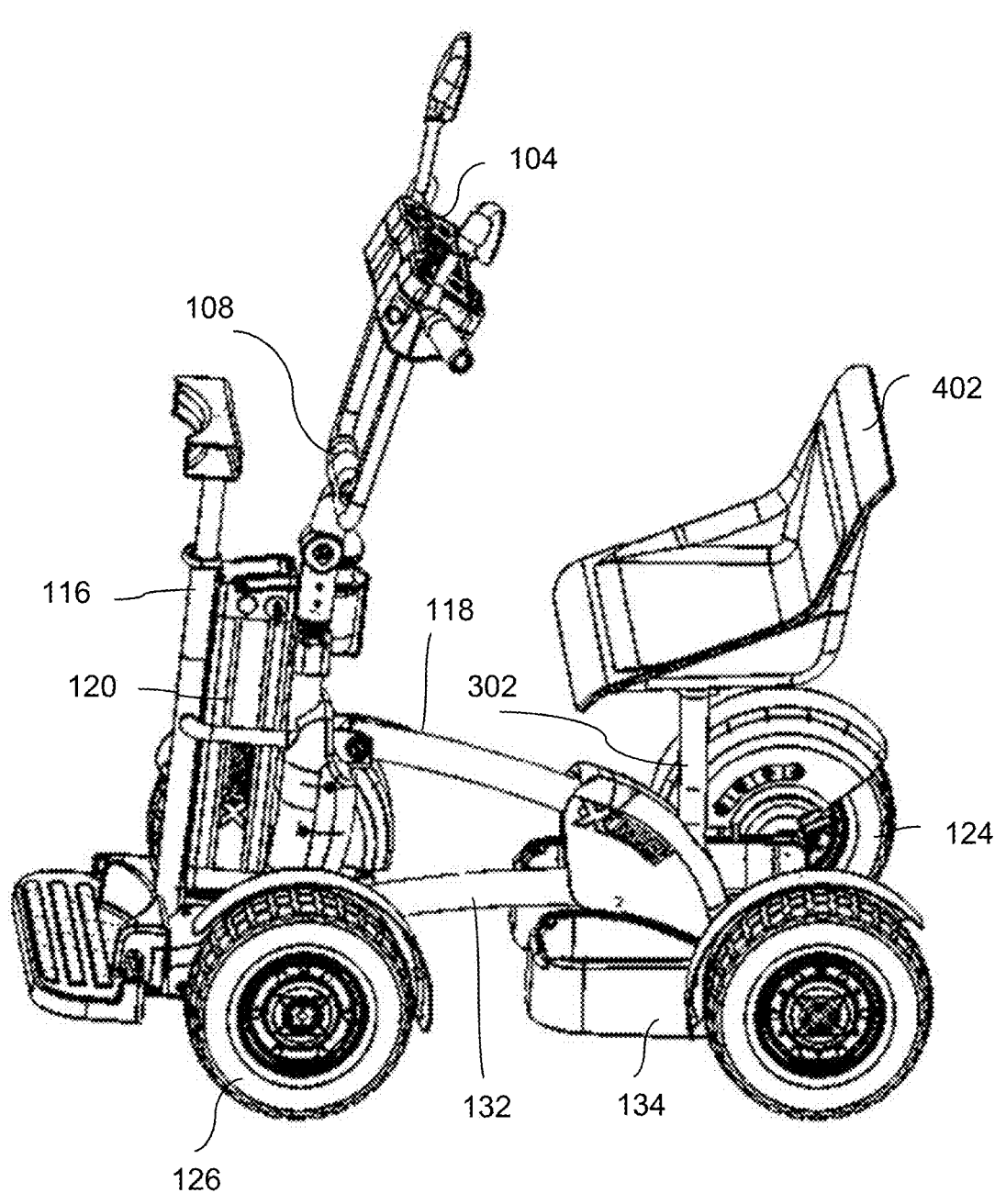
FIG. 4 is a schematic perspective view of a scooter with a mobility scooter/tractor-like seat in accordance with an embodiment of the current invention.

FIG. 3 is a schematic perspective view of a scooter with a bicycle-like seat in accordance with an embodiment of the current invention. FIG. 4 is a schematic perspective view of a scooter with a mobility scooter/tractor-like seat in accordance with an embodiment of the current invention. In an embodiment, when in scooter mode riding is optionally performed in a stand-up position on one or more footboards 134 (e.g., FIG. 1), while seated on a high bicycle-like seat 302 (e.g., FIG. 3), and/or while seated on a mobility scooter/tractor-like seat 402 (e.g., FIG. 4). The bicycle-like seat 302 or the mobility scooter/tractor-like seat 402 are optionally supported by a height adjustable telescoping tubular seat support 304. The support 304 is optionally affixed to the linkage system by a connector. Optionally, the connection may be reversible. For example, a connector may include a port 136. Optionally, port 136 is situated on the rear portion of the scooter.

Figure 5:
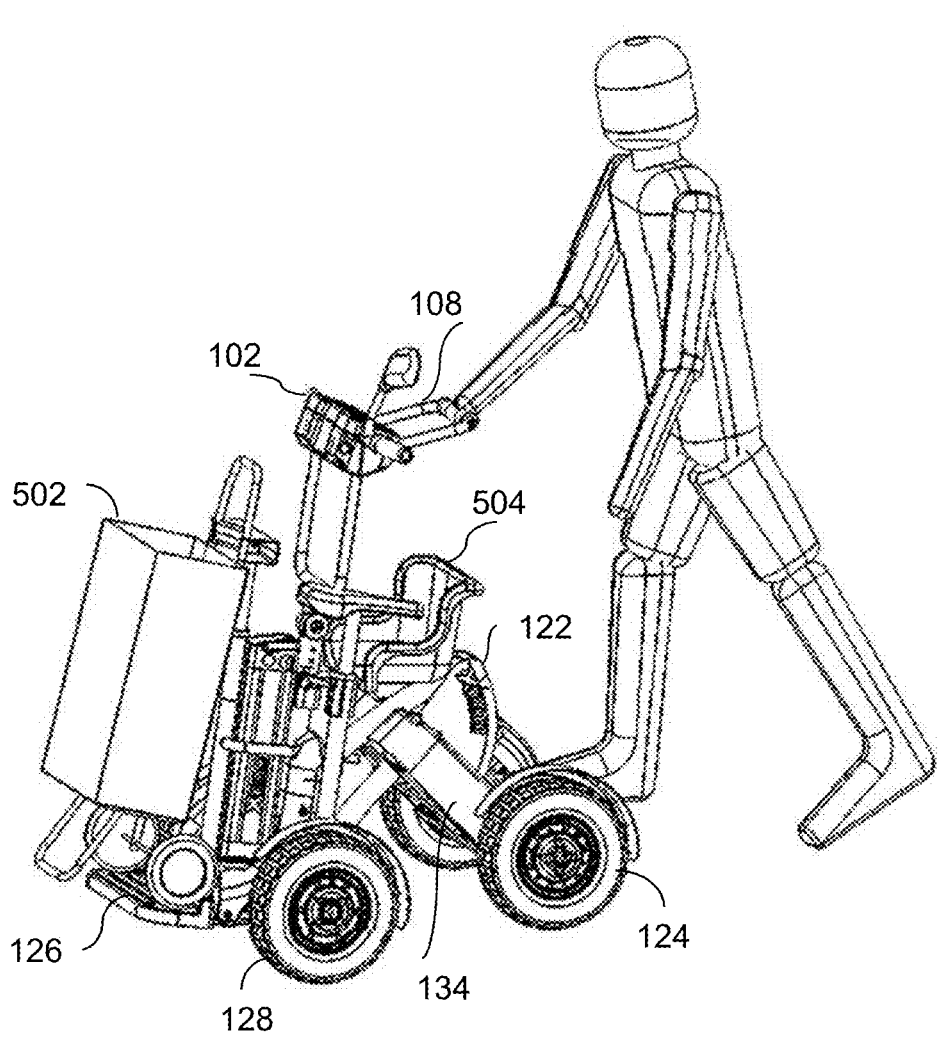
FIG. 5 is a schematic perspective view of a vehicle in push-cart mode with accessories in accordance with an embodiment of the current invention.

FIG. 5 is a schematic perspective view of a vehicle in push-cart mode with accessories (in this exemplary case, a child seat and a shopping cart) in accordance with an embodiment of the current invention.

Figure 9:
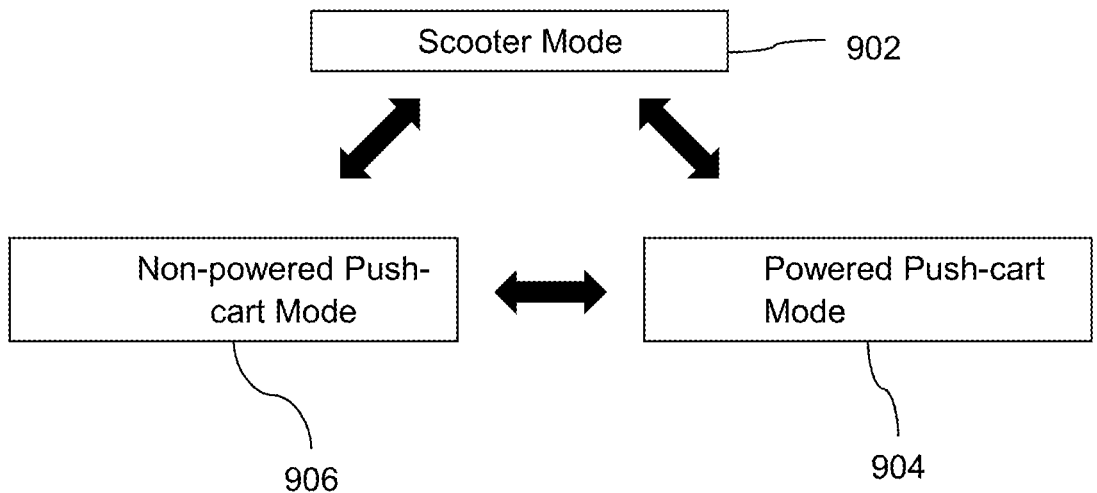
FIG. 9 is a flow chart diagram showing reversibly transforming of the vehicle between scooter mode and push-cart mode in accordance with an embodiment of the current invention.

In an embodiment, push-cart mode is optionally powered or non-powered (e.g., FIG. 9). In an embodiment, in push-cart mode is configured to be pushed manually, and/or to serve as a walker in non-powered mode (e.g., FIG. 5).

Figure 6:
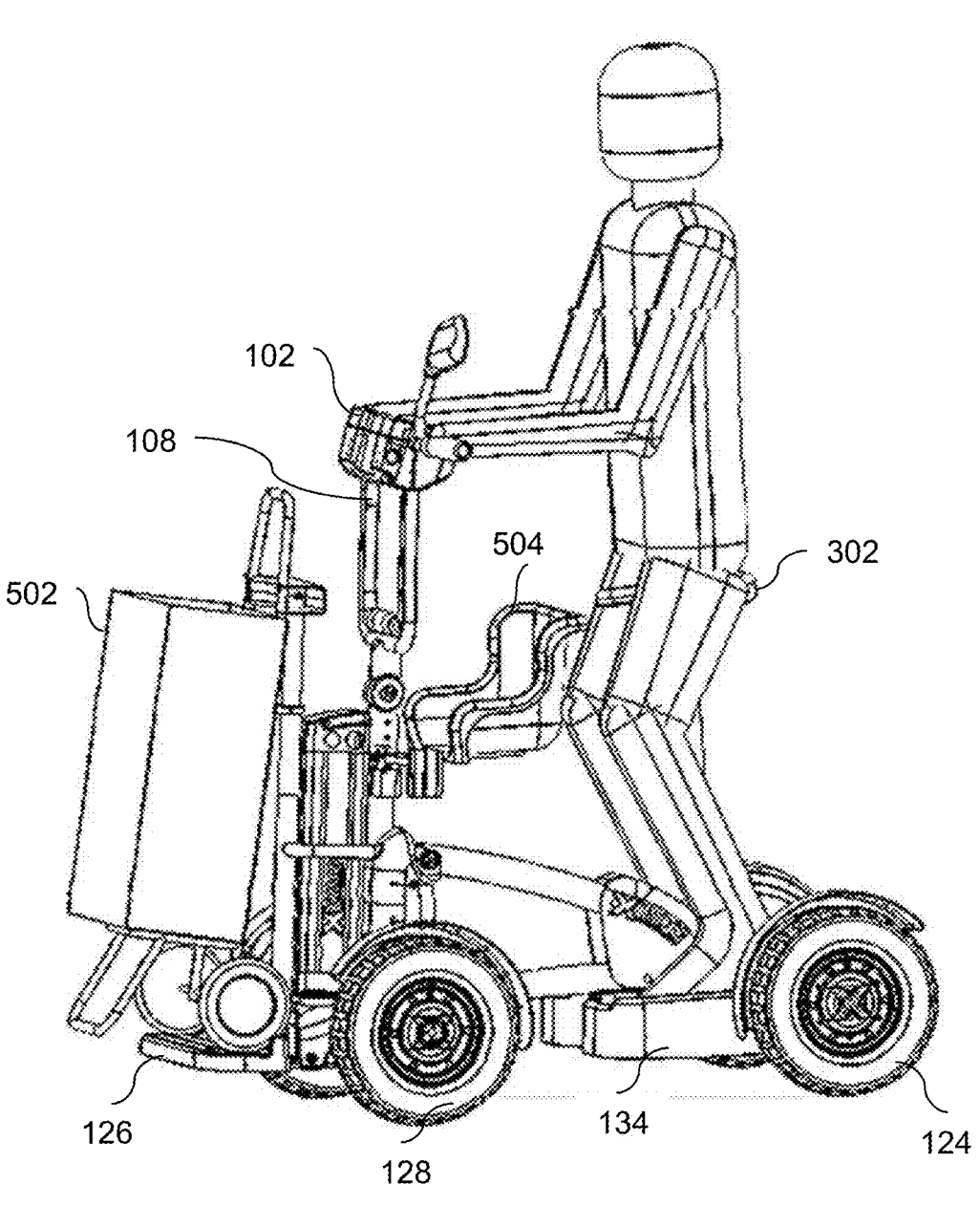
FIG. 6 is a schematic perspective view of a scooter with a bicycle-like seat with accessories in accordance with an embodiment of the current invention.

FIG. 6 is a schematic perspective view of a scooter with a bicycle-like seat with accessories (in this exemplary case, a child seat and a shopping cart) in accordance with an embodiment of the current invention. In an embodiment, a control panel 104 allows the user to pre-set or adjust the speed of the scooter mode and/or the push-cart powered mode. For example, panel 104, may be mounted on the handlebars 102. In an embodiment, while in scooter mode the scooter's speed is controlled by the user with a throttle. In an embodiment, while in push-cart powered mode the cart's movement is controlled by the user with a push button on the walking handle 108.

Figure 7:
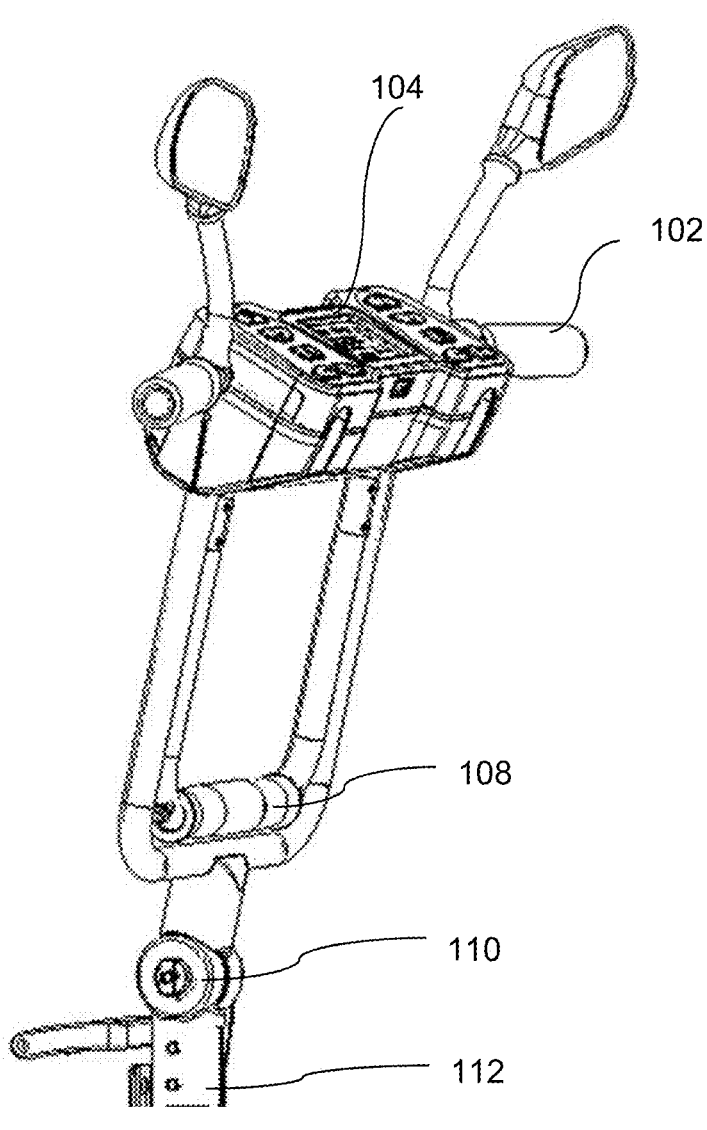
FIG. 7 is a schematic perspective view of a walking handle in stored position in accordance with an embodiment of the current invention.
Figure 8:
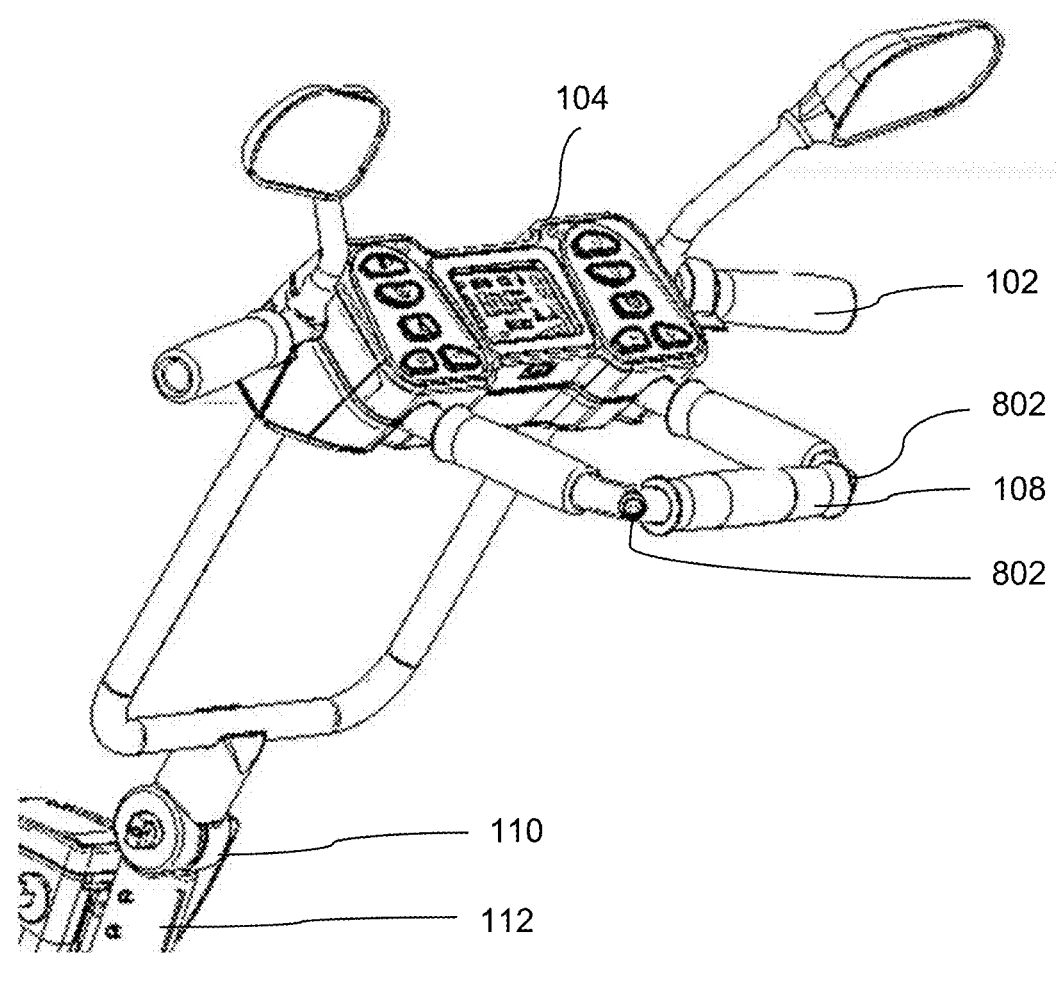
FIG. 8 is a schematic perspective view of a walking handle in extended position in accordance with an embodiment of the current invention.

FIG. 7 is a schematic perspective view of a walking handle in stored position in accordance with an embodiment of the current invention. FIG. 8 is a schematic perspective view of a walking handle in extended position in accordance with an embodiment of the current invention. While the vehicle is in push-cart non-powered mode it might become difficult to push it up a steep climb, particularly if heavily loaded. Additionally or alternatively, it may be difficult to stop it in a steep descent. Optionally, the user may switch to powered mode. For example, the switch may be on the control panel. In some cases, this action might not be straight forward under pressure. Optionally, in an embodiment the motor may be engaged in the push-cart mode by pushing a button 802. In an embodiment, the walking handle 108 has a button 802 on either side to engage the motor when in push-cart mode, one on each side, allowing switching hands while walking in powered mode. Alternatively or additionally, there may be a control for a braking system on the walking handle (for example a brake lever and/or a dead man's switch which automatically brakes the vehicle when the user lets go.

In an embodiment, releasing the button 802 on the walking handle in push-cart mode stops the vehicle automatically, and/or after stopping the parking brake is engaged automatically.

In an embodiment the motor of the vehicle is powered by a battery 120. For example, battery 120 may be held in place by a battery support. Optionally, the battery support may be located on the front portion of the vehicle. The battery 120 is optionally removable and/or chargeable (e.g., similar to the battery of an electric bicycle). The motor and/or motors powered by the battery is/are optionally located inside the front and/or back wheels.

In an embodiment, the vehicle while in push-cart powered mode is directed by remote control, follows the user automatically, and/or is directed manually. Optionally, the vehicle may be directed by remote-control (remote control mode) and/or to follow the user automatically (follow me mode) in any mode. For example, the vehicle may be directed by remote-control and/or follow the user automatically while in a scooter mode (e.g., with the linkage extended and/or with the steering column directed vertically). Alternatively or additionally, the vehicle may be directed by remote-control and/or to follow the user automatically while in the push-cart mode (e.g., with the linkage contracted (e.g., folded) and/or with the steering column directed backward).

In an embodiment the accessory supports 116, 126 are configured to carry a shopping basket or cart 502, a golf bag, one or more child seats 504, an umbrella, a water bottle or thermos, other types of loads, or combinations thereof, in both scooter mode (e.g., FIG. 5) and/or in push-cart mode (e.g., FIG. 6).

FIG. 9 is a flow chart diagram showing reversibly transforming of the vehicle between scooter mode, push-cart powered mode and/or push-cart non-powered mode in accordance with an embodiment of the current invention. In some embodiments, when reaching an obstacle and/or uneven terrain while riding in the scooter mode, the user may convert to push-cart mode 904, 902, pass the problematic section, then convert back to scooter mode 902.

In some embodiments, when in non-powered push-cart mode 904 the user may engage the motor for use in powered and/or power assisted push-cart mode 906. For example, the powered mode may be used for additional assistance with heavy loads and/or steep and/or uneven terrain.

FIG. 10. is a flow chart diagram showing the conversion from scooter mode to push-cart mode in accordance with an embodiment of the current invention. In an embodiment on converting from scooter mode 1002 to push-cart mode 1014, the linkage system folds from one mode to the other, such that the rear portion 1004 of the scooter moves towards the front portion of the scooter. The rear portion becoming almost vertical 1008, thereby reducing the distance between the front wheels and the rear wheels 1006, and wherein the front portion and/or the steering system are tilted towards the user and/or an extension handle is extended 1012 backward towards the user. Together with the walking handle this provides enough space for the user's legs. In some embodiments, when the steering system is tilted backward a caster effect in the front wheels 1010 is created.

FIG. 11 is a block diagram illustration of a transformable scooter in accordance with an exemplary embodiment of the invention. In some embodiments, a vehicle may include a front portion 1104 connected to a rear portion 1108 by a transformable linkage 1106. The front portion 1104 may include one or more front wheels 1124*b* and/or the rear portion 1108 may include one or more rear wheels 124*a*. For example, the linkage 1106 may transform by changing a length. For example, in a push-cart mode the linkage 1106 may be contracted and/or contract a wheel base between the front wheels 124*b* and rear wheels 124*a*. For example, in a scooter mode, the linkage 1106 may be extended and/or extend a wheel base between the front wheels 124*b* and rear wheels 124*a*. Optionally the vehicle may include a transformable steering 1102. For example, in the scooter mode the steering 1102 may stand up over the front portion of the vehicle.

Optionally the vehicle includes one or more motors 1111. For example, the vehicle may include dual motors 1111 in the front wheels 1124*b* of the front portion 1104 of the vehicle. Additionally or alternatively, one or more motors may be installed into the rear wheels 1124*a* of the vehicle. Alternatively or additionally, a motor may be mounted on the chassis of the vehicle (e.g., the front portion 1104 and/or the rear portion 1108) and/or drive the wheels 124, 128 via a drive chain.

The embodiments illustrated herein may be combined. For example, the embodiment of FIG. 11 may include any and/or all of the features described in previous embodiments.

FIG. 12 is a cross sectional view of a transformable scooter in accordance with an exemplary embodiment of the invention. In some embodiments, a lock 1247 holds the vehicle in a mode (for example, in FIG. 12 lock 1247 is shown holding the vehicle in a scooter mode). Alternatively or additionally, the lock 1247 may also lock the vehicle in the push-cart mode. Optionally a lever 1231 can be used to unlock the linkage of the vehicle, for example to switch it from one mode to another (e.g., from scooter to push-cart mode).

In some embodiments, a front portion of the vehicle may be linked to a rear portion of the vehicle by a linkage including spacer bars 118, 132. Optionally, the linkage also includes hinges. For example, an upper bar 118 attached to a front portion via a hinge 1241*b* and/or to a rear portion via a hinge 1241*d*. For example, a lower bar 132 attached to a front portion via a hinge 1241*a* and/or to a rear portion via a hinge 1241*c*. Optionally, when the vehicle is folded from the scooter mode (e.g., the rear section rotates with the front side rotating upward and the rear side rotating downward) around hinges 1241*c* and/or 1241*d*. Additionally or alternatively, when the vehicle is folded from the scooter mode to the push-cart mode, bars 118 and 132 are brought closer together and/or rotate towards a more vertical orientation.

In some embodiments, the front portion may be separable from the rear portion. For example, the linkage may include one or more quick connectors 1243 facilitating reversible connection and/or disconnection of the linkage to the front portion and/or the rear portion. For example, hinges 1241*b* and/or 1241*a* may include a quick connector 1243 which facilitates reversible disconnection and/or reconnection of bars 118 and 132 to the front portion.

In some embodiments, a quick connector 1243 may include a self locked eccentric clamping lever. Optionally the lever may be operable with no tools and/or no dismantling of parts, e.g., similar to a bicycle wheel quick release.

Some embodiments may include a trailer hitch 1233. For example, hitch 1233 extends backwards (e.g., of footboard 134) e.g., for attaching a trailer thereto. Optionally, in the push-cart mode, footboard 134 is rotated vertically and/or hitch 1233 extends downward of the footboard 134.

FIG. 13 is a perspective view of a linkage of a transformable scooter in accordance with an exemplary embodiment of the invention.

In some embodiments, a quick connector 1243 on an adjustable 110 handlebar link facilitates reversible removal of handlebars of the vehicle.

In some embodiments, a quick connector 1243 may include a self locked eccentric clamping lever. Optionally, the lever is operable with no tools, e.g., similar to a bicycle wheel quick release.

FIG. 14 is a perspective view of separated sections of a transformable scooter in accordance with an exemplary embodiment of the invention. In FIG. 14, the left front wheel of the vehicle has been removed in order to give a better view of the connections and/or linkage of the vehicle. In some embodiments, hook like mounts 1542*a* and 1542*b* (e.g., similar to bicycle wheel mounts) hold quick connectors 1243 at hinges 1241*a* and 1241*b* respectively, thereby holding the linkage to the front portion of the vehicle. For example, the disconnect the front and rear portions of the vehicle, a user loosens quick connectors 1243 at hinges 1241*a* and 1241*b* and/or lifts bars 118 and 132 from mounts 1542*b* and 1542*a* respectively. Additionally or alternatively, handle bars 102 and/or control panel 104 may be removed by loosening a quick connector 1243 at adjustable 110 joint. For example, disassembling the vehicle may make it easier to store and/or transport the vehicle. Optionally, the vehicle may include connectors to hold and/or store removable parts such as the seat and/or the handlebars. Optionally, there may be quick connecting power and/or control cables and/or a control panel may connect wirelessly to various actuators and/or motors of the vehicle.

FIG. 15 is a perspective view of a transformable scooter with a trailer in accordance with an exemplary embodiment of the invention. Optionally a trailer 1537 connects to trailer hitch 1233. For example, trailer 1537 may be a single axle and/or two wheeled 1524 trailer. For example, trailer 1537 may have a maximum load of between 30 to 70 kg and/or between 10 to 30 kg and/or between 70 to 140 kg and/or between 140 to 300 kg. Alternatively or additionally, a four wheel and/or two axle trailer may connect to trailer hitch 1233.

FIG. 16 is a perspective view of a trailer in accordance with an exemplary embodiment of the invention. In some embodiments, a trailer 1537 may be configured to stand along. For example, a stiff pulling bar 1535 may extend below the trailer 1537 with a connector 1634 for trailer hitch 1233 and/or a support for the trailer 1537 when it is standing on its own. Additionally or optionally, the trailer 1537 may include a rear support 1639 that supports the trailer 1537 and/or inhibits falling over backward.

It is expected that during the life of a patent maturing from this application many relevant technologies will be developed and the scope of the terms is intended to include all such new technologies a priori.

As used herein the term "about" refers to ±10%

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween. When multiple ranges are listed for a single variable, a combination of the ranges is also included (for example the ranges from 1 to 2 and/or from 2 to 4 also includes the combined range from 1 to 4).

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A vehicle which is reversibly convertible from scooter mode to push-cart mode comprising:
   a steering system comprising a front wheel, a steering column, connected to handlebars configured for use in said scooter mode, and an extendable walking handle configured for use in said push-cart mode;
   a front portion connected to the steering system;
   a rear portion comprising a rear wheel; and
   a linkage connecting said front portion to said rear portion, wherein said linkage is configured for shortening a wheelbase of the vehicle in said push-cart mode in comparison to said scooter mode,
   wherein on converting to said push-cart mode, the steering system is configured to tilt backward towards a user and the walking handle is configured to extend backwards towards a user standing behind the vehicle,
   wherein push-cart mode is configured to be switchable between a powered mode and a non-powered mode, and
   wherein the walking handle comprises a user-operable control configured to switch the vehicle between the powered mode and the non-powered mode while the vehicle is in the push-cart mode.

2. The vehicle of claim 1, wherein said linkage includes a reversible connection configured to separate the front and the rear portions.

3. The vehicle of claim 1, wherein on converting to push-cart mode the front portion and the steering system tilts backward.

4. The vehicle of claim 1, wherein on converting to push-cart mode the steering system tilts backward towards a user such that a caster effect is created in the front wheel.

5. The vehicle of claim 4, wherein the vehicle is configured for direction by remote control while in a push-cart powered mode utilizing a caster effect in the front wheel.

6. The vehicle of claim 4, wherein the vehicle is configured to follow a user automatically while in a push-cart powered mode utilizing a caster effect in the front wheel.

7. The vehicle of claim 1, wherein said handlebars are reversibly removable from the vehicle.

8. The vehicle of claim 1, wherein the walking handle is adjustable and lockable.

9. The vehicle of claim 1, wherein the handlebars comprise a control panel configured to pre-set or adjust a speed of the vehicle in a motorized mode.

10. The vehicle of claim 1, wherein said handlebars comprise a control panel configured to switch the vehicle between push-cart powered mode and non-powered mode.

11. The vehicle of claim 1, wherein in push-cart mode the vehicle is configured to be pushed and steered manually from behind using the walking handle while in non-powered mode.

12. The vehicle of claim 1, wherein the user-operable control on the walking handle is configured to activates a motor to provide push-assistance while the vehicle is in the push-cart mode.

13. The vehicle of claim 1, wherein the vehicle is stopped by at least one of releasing a power button on the walking handle in the push-cart mode and releasing a speed throttle on the handlebars in the scooter mode.

14. The vehicle of claim 1, wherein while in push-cart powered mode the vehicle is configured to be directed by at least one of remote control and following a user automatically.

15. The vehicle of claim 1, wherein in scooter mode riding is performed in a stand-up position on one or more footboards, while seated on a high bicycle-like seat, or while seated on a mobility scooter/tractor-like seat.

16. The vehicle of claim 15, wherein at least one of said bicycle-like seat and said mobility scooter/tractor-like seat are stowable onboard the vehicle.

17. The vehicle of claim 1, wherein the linkage is foldable and locks in each of the scooter mode and the push-cart mode.

18. The vehicle of claim 1, wherein said linkage includes at least one of multiple hinges and multiple bars.

19. The vehicle of claim 1, wherein the vehicle is configured to be steered manually from behind using the walking handle in push-cart powered mode.

20. The vehicle of claim 1, wherein said front wheel is steerable by rotation of said steering column and wherein said walking handle is connected to the steering column configured for rotating the steering column thereby steering the vehicle by directing the walking handle from side to side in the powered mode and the non-powered mode while the vehicle is in the push-cart mode.

* * * * *